April 5, 1960 N. T. WATTERS 2,931,854

FILTER-RECTIFIER-GATE CIRCUIT

Filed Nov. 18, 1955 2 Sheets-Sheet 1

NORMAN T. WATTERS
*INVENTOR.*

BY Francis W. Crotty

HIS ATTORNEY.

April 5, 1960 N. T. WATTERS 2,931,854
FILTER-RECTIFIER-GATE CIRCUIT
Filed Nov. 18, 1955 2 Sheets-Sheet 2

INVENTOR.
NORMAN T. WATTERS
BY Francis W. Crotty
HIS ATTORNEY.

2,931,854

FILTER-RECTIFIER-GATE CIRCUIT

Norman T. Watters, Westchester, Ill., assignor to Zenith Radio Corporation, a corporation of Delaware Application November 18, 1955, Serial No. 547,816

5 Claims. (Cl. 178—5.1)

Figure 1:
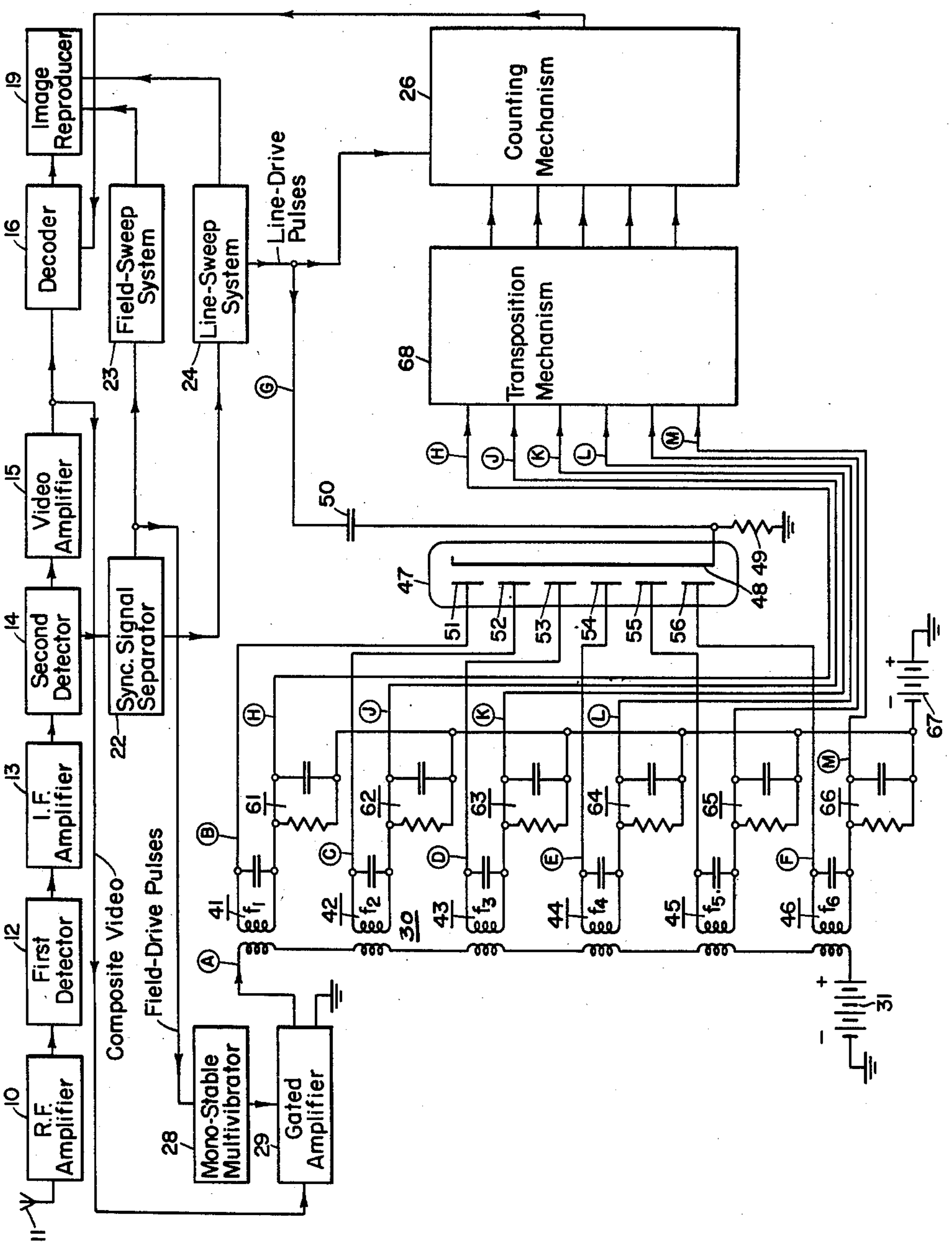

This invention relates to a novel filter-rectifier-gate circuit for utilizing a plurality of bursts of a particular signal frequency to gate in predetermined ones of a series of periodically recurring timing pulses. The circuit is particularly attractive when incorporated in a subscription television receiver and will be described in that environment.

In certain previous subscription television systems the television signal is coded in accordance with a selected code schedule at the transmitter, and coding signal bursts representing or indicative of that schedule are transmitted to subscriber receivers along with the coded television signal. There the bursts are employed to gate in sharply defined timing pulses, such as horizontal- or line-drive pulses, to effect decoding in precise synchronism with the coding operation at the transmitter. One such prior system is shown, for example, in copending application Serial No. 479,170, filed December 31, 1954, in the name of Erwin M. Roschke, and assigned to the present assignee.

In that system a cyclic counting mechanism, comprising a blocking oscillator and two bi-stable multivibrators, is actuated in response to line-drive pulses to develop a square wave signal having amplitude changes after each series of a predetermined number of line-trace intervals. This signal is employed to effect mode changes in the transmitter by periodically introducing or removing a time delay of the video with respect to the synchronizing components.

During each field-retrace interval a combination of randomly sequenced code signal bursts, having predetermined identifying frequencies, is developed and by means of a switching or transposition mechanism, these various bursts, after rectification, are segregated from one another and utilized to gate in certain line-drive pulses to selected input circuits of the bi-stable multivibrators in the counting mechanism. The application of line-drive pulses to the counter is determined by the adjustment of the switching mechanism which is made known only to authorized subscribers. With this arrangement, the line-drive pulses selectively trigger the bi-stable multivibrators in a prescribed random or irregular sequence imposed by the code bursts to interrupt the normal cyclic operation of the counting mechanism during the field-retrace intervals and re-phase the square wave developed thereby.

Each such combination of code signal bursts is transmitted to subscriber receivers along with the composite video signal during the field-retrace interval in which it occurs in order to permit a decoding arrangement to be controlled in precisely the same manner as the coding mechanism at the transmitter. By employing the code bursts as gating signals to route precisely timed line-drive pulses to the counting mechanism of the decoder, synchronous operation between the transmitter and various receivers is insured.

The present invention is directed to a combination filter-rectifier-gate circuit which may be utilized in subscription television systems such as that described in the Roschke copending application. It features a resonant circuit which is loaded only during the relatively short intervals when a timing or line-drive pulse is gated in. This feature permits the resonant circuit to exhibit a relatively high Q (figure of merit) with consequent high noise rejection.

It is, accordingly, an object of the present invention to provide a novel filter-rectifier-gate circuit for utilizing a series of periodically recurring timing pulses and a plurality of signal bursts of a particular frequency having a predetermined time relation with respect to the timing pulses.

It is another object of the invention to provide an improved filter-rectifier-gate circuit for use in a subscription television receiver which responds to code signal bursts of different frequencies to select predetermined horizontal-drive pulses.

The filter-rectifier-gate circuit constructed in accordance with the invention may utilize a series of periodically recurring timing pulses and a plurality of signal bursts of a particular frequency having a predetermined time relation with respect to the timing pulses but occurring less frequently than the timing pulses and individually having a time duration which is long with respect to the duration of the timing pulses. It comprises a non-linear device and amplitude-delay biasing means for establishing in the device a predetermined threshold level such that the device conducts only in response to an applied potential exceeding that threshold. The filter-rectifier-gate circuit has a resonant circuit tuned to the particular burst frequency and a filter network load circuit for deriving an output signal through the non-linear device. Means are provided for coupling the non-linear device, resonant circuit and load circuit in series such that the resonant circuit is loaded only during conductive intervals of the non-linear device. Means are provided for supplying each of the signal bursts to the resonant circuit to develop oscillations therein. The circuit further includes means for supplying the timing pulses to the non-linear device with a polarity tending to render the device conductive. The Q of the resonant circuit is such that the envelope level of the oscillations developed in response to each signal burst, when added to the timing pulse immediately succeeding the commencement of each signal burst, exceeds the threshold level of the non-linear device but is insufficient to reach the threshold level when combined with the next-succeeding timing pulse.

Figure 2:
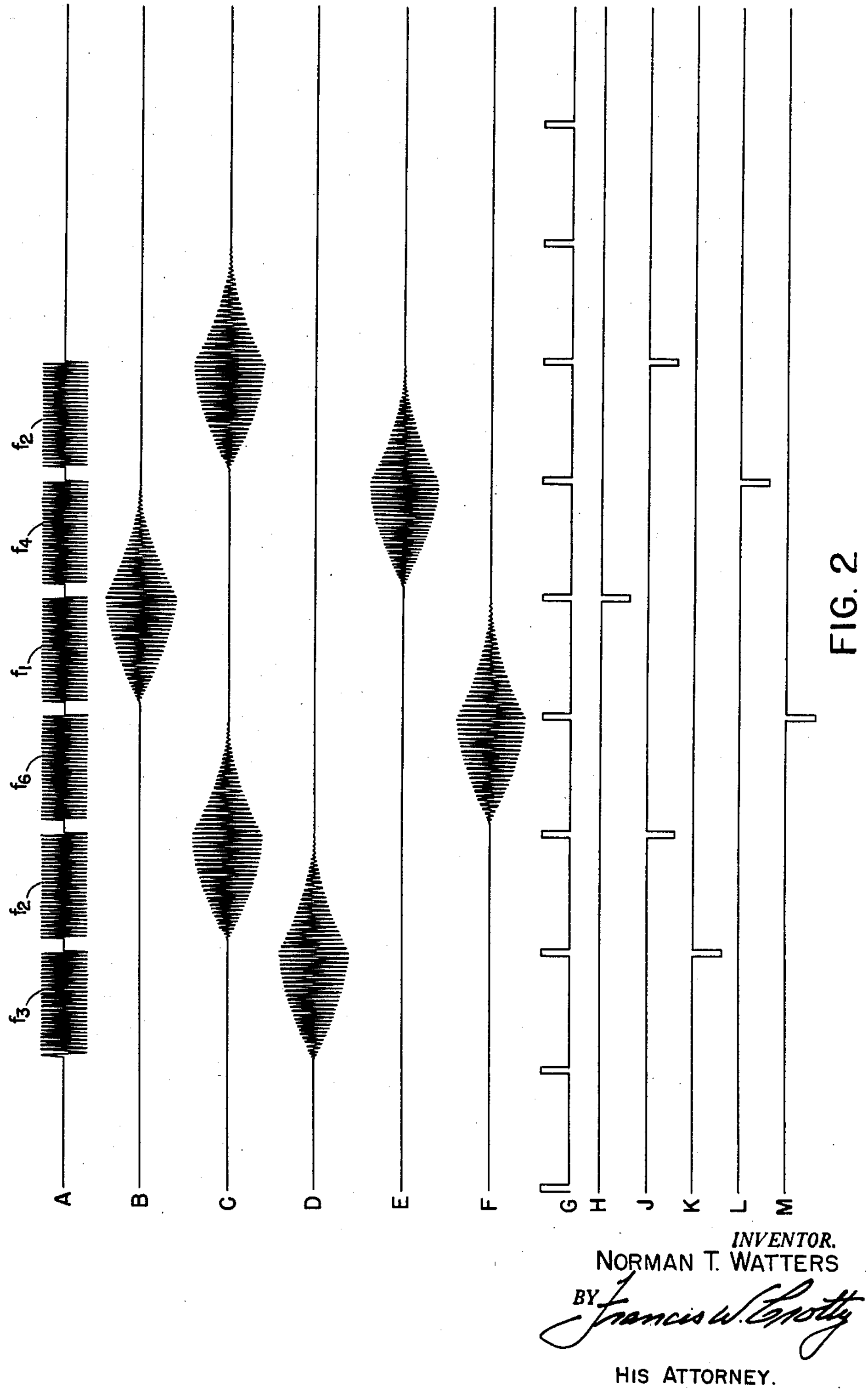

The features of this invention which are believed to be new are set forth with particularity in the appended claims. The invention, together with further objects and advantages thereof, may best be understood, however, by reference to the following description taken in conjunction with the accompanying drawings, in which:

Figure 1 is a schematic diagram of a subscription television receiver including a filter-rectifier-gate circuit constructed in accordance with the invention; and, Figure 2 shows a series of wave forms helpful in explaining the operation of the filter-rectifier-gate circuit of Figure 1.

The receiver illustrated is constructed to utilize a telecast originating at a transmitter constructed in accordance with the aforementioned disclosure by Roschke. It comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is coupled through a decoder 16 to the input electrodes of a cathode-ray image-reproducing device 19.

Decoder 16 may be similar to that disclosed and claimed in copending application Serial No. 243,039, filed August 22, 1951, and issued August 7, 1956 as Patent 2,758,153, in the name of Robert Adler, and assigned to the present assignee. It may comprise a beam-deflection tube having a pair of output circuits which may be selectively coupled into the video channel as the electron beam thereof is deflected from one to the other of two segmental anodes in synchronism with mode changes of the transmitted signal. As mentioned hereinbefore, these mode changes take the form of variations in the timing of the video components relative to the synchronizing components of the received composite television signal. Consequently, the output circuit coupled to one anode segment includes a time delay network while the output connected to the other anode segment does not and the timing variations are compensated, effectively to decode the television signal, as the beam of the deflection tube is switched between its anodes. This switching effect is accomplished by means of a beam deflection-control or actuating signal applied to decoder 16, as explained hereinafter.

Second detector 14 is also coupled to a synchronizing-signal separator 22 which is coupled, in turn, to a field-sweep system 23 and to a line-sweep system 24. The output terminals of sweep systems 23 and 24 are connected respectively to field- and line-deflection elements (not shown) associated with image-reproducer 19.

In order to produce a deflection-control signal for decoder 16, a counting mechanism 26 is connected to line-sweep system 24 to derive line-drive pulses therefrom and its output terminals connect to the deflection-control elements of the decoder. This counting mechanism is identical to that disclosed in the transmitter of the aforementioned Roschke application, Serial No. 479,170, and includes a 5:1 blocking oscillator and two bi-stable multivibrators. All three are connected in cascade, and are triggered by the line-drive pulses to develop a square wave signal having amplitude excursions after each series of ten line-trace intervals. Consequently, the time-delay network in decoder 16 is effectively interposed in the video channel during alternate groups of ten successive line-trace intervals to introduce a time delay between the video and synchronizing components.

As described in the Roschke application, the air-borne coding signal comprises up to six bursts of six various signal frequencies $f_1$–$f_6$, individually transmitted between an assigned pair of line-drive pulses superimposed on the vertical blanking pulse, in order to control the phasing or the timing of the amplitude excursions of the deflection-control or decoding signal developed at the output of counting mechanism 26 so that such excursions occur in exact synchronism with those of the corresponding coding signal at the transmitter. To facilitate the separation of these code signal bursts it is desirable to provide circuitry which will gate in only that portion of the composite video signal containing the bursts. To that end, field-drive pulses are derived from synchronizing-signal separator 22 and supplied to a mono-stable multivibrator 28 having output terminals connected to a normally-closed gated amplifier 29. The output terminals of video amplifier 15 are also connected to gated amplifier 29 to supply the composite video signal thereto, and the output circuit of this amplifier is completed through a sectionalized primary winding of a transformer 30 to the positive terminal of a source of unidirectional operating potential, here shown as a battery 31 the negative terminal of which is connected to ground. A series of six secondary windings of the transformer constitute the inductive branches of a series of six frequency-selective resonant circuits 41–46, individually tuned to a particular one of the six frequencies employed in coding as shown in the drawing by the indicia $f_1$–$f_6$.

In accordance with the present invention, one side of each of resonant circuits 41–46 is connected respectively to an assigned one of a series of anodes 51–56 of a non-linear device shown as a multisection diode 47. The diode has only one cathode 48, and this single cathode is connected to ground through a resistor 49. Cathode 48 is also coupled through a condenser 50 to line-sweep system 24 to derive line-drive pulses therefrom.

The other side of each of resonant circuits 41–46 is connected through a respective one of a series of filter network load circuits 61–66, individually comprising a parallel resistor-condenser combination, to the negative terminal of a source of bias potential, here shown as a battery 67 the positive terminal of which is connected to ground. The junctions of resonant circuit 41 and load circuit 61, resonant circuit 42 and load 62, tuned circuit 43 and network 63, tuned circuit 44 and load 64, tuned circuit 45 and RC combination 65, and resonant circuit 46 and filter network load circuit 66, are connected respectively to assigned input terminals of a transposition or switching mechanism 68, which is identical to a switching arrangement employed in the transmitter. It is provided for selectively connecting any of its input circuits leading from loads 61–66 to any of five output circuits which in turn are connected to various input circuits of the two bi-stable multivibrators in counting mechanism 26. Decoding can be accomplished only if the various interconnections established by switching mechanism 68 are identical to the corresponding interconnections established by the transposition mechanism interposed between the source of code signal bursts and the bi-stable multivibrators in the coding apparatus at the transmitter. The necessary information for setting transposition mechanism 68 is disseminated only to authorized subscribers and a suitable charge may, of course, be assessed for such information.

The described decoding circuitry effectively includes six independent filter-rectifier-gate circuits for the six different frequencies $f_1$–$f_6$. Each of the six circuits includes a resonant circuit, such as tuned circuit 41 which is selective to code frequency $f_1$, a filter network load circuit like 61, and a section of diode 47, such as the section associated with anode 51. The negative potential from source 67 is applied through load circuit 61 and tuned circuit 41 to anode 51 to establish for that portion of the diode a predetermined amplitude delay bias or threshold level such that it conducts only in response to an applied potential exceeding the threshold. The threshold is sufficiently high that oscillations developed in resonant circuit 41 in response to the application of a code burst of frequency $f_1$ are not adequate in themselves to overcome it and cause conduction. Moreover, the load 61 is in circuit with the resonant circuit only when the diode 48—51 conducts and, consequently, the resonant circuit is loaded only during conductive intervals of the diode. These same considerations apply equally as well to the remaining selector circuits.

Line-drive timing pulses from sweep system 24 are applied to cathode 48 with negative polarity and tend to render the diode conductive, but such a pulse by itself does not have sufficient magnitude to overcome the delay bias. However, when such a timing pulse is applied to the diode during the high amplitude portion of the envelope of oscillations developed in one of the tuned circuits under the excitation of a code burst of suitable frequency, the threshold level of the diode is exceeded and it becomes conductive. When a diode section does conduct, an output pulse is developed across the filter network load circuit associated with the energized tuned circuit for application to one of the input circuits of transposition mechanism 38. In this manner the timing pulses are selectively translated, through the excitation of the selector circuits, to the several input terminals of transposition mechanism 68 wherein they are routed, as required, to the output terminals and from there to the several inputs of the counter 26.

By preventing loading of each resonant circuit, except during the pulse intervals in which timing pulses are gated in, the Q (figure of merit) of the circuit is maintained at a relatively high value and there is a high degree of noise rejection. Since each resonant circuit is not loaded most of the time, the Q or figure of merit would, of course, equal the inductive reactance of the tuned circuit at its resonant frequency divided by the series resistance within the resonant circuit. While the circuit parameters of each tuned circuit are adjusted so that the Q is high, there is, however, a limit to its permissible value. The Q should be high enough to provide good noise rejection but yet should not be so high that the oscillations, resulting from the excitation of a single code burst, have sufficient amplitude to combine with a second timing pulse and exceed the threshold level of the diode. This is necessary since it is desired to gate in only one horizontal pulse in response to each code signal burst.

Inasmuch as a complete description of the coding technique of the illustrated system is included in the copending Roschke application and since the coding technique itself forms no part of the present invention, the operation of the complete receiver with the exception of the filter-rectifier-gate circuits will be described only briefly. The coded television signal is intercepted by antenna 11, amplified in radio-frequency amplifier 10, heterodyned to the selected intermediate frequency in first detector 12, amplified in intermediate-frequency amplifier 13 and detected in second detector 14 to produce a coded composite video signal. This signal is amplified in video amplifier 15, translated through decoder 16 and impressed on the input electrodes of image-reproducing device 19 to control the intensity of the electron beam of the device in well-known manner.

The synchronizing components are separated in separator 22, the field-synchronizing pulses being utilized to synchronize the operation of sweep system 23 and consequently the vertical-deflection signal supplied to the field-deflection elements of reproducer 19, whereas the line-synchronizing pulses are utilized to synchronize sweep system 24 and therefore the horizontal-deflection signal supplied to the horizontal-deflection elements in the image reproducer. Of course, the sound modulated carrier wave normally received along with the video carrier is detected and reproduced in an appropriate audio system which has been omitted from the drawing for the purposes of simplicity.

Field-drive pulses from separator 22 are supplied to mono-stable multivibrator 28 to produce a gating pulse for normally-closed gated amplifier 29. The parameters of the multivibrator are so chosen that the pulse output, which opens gate 29, overlaps, in point of time, that portion of the field-retrace interval of the composite video signal which includes the code signal bursts. The composite video signal from amplifier 15 is continuously applied to the input circuit of amplifier 29, but only the information contained during the interval of the gating pulse is translated to the primary winding of transformer 30.

A typical combination of code signal bursts which may occur during a field-retrace interval, and which would therefore be applied to the primary winding of transformer 30, is shown in curve A of Figure 2. As mentioned hereinbefore, each of these bursts occurs between two successive line-synchronizing pulses during the vertical-retrace interval. Since resonant circuits 41–46 are individually tuned to an assigned one of the six different frequencies $f_1$–$f_6$, the bursts are separated from each other. Consequently, oscillations are developed in tuned circuit 41 in response to the burst of code frequency $f_1$ in the combination of curve A to provide the signal shown in curve B at diode anode 51. Similarly, tuned circuit 42 responds to the two bursts of code frequency $f_2$ in the combination to develop envelopes of oscillations for application to anode 52 as shown in curve C. Tuned circuit 43 responds to the burst of code frequency $f_3$ to build up the envelope of oscillations shown in curve D for application to anode 53; tuned circuit 44 responds to the burst of code frequency $f_4$ to produce the oscillations shown in curve E for application to anode 54; and resonant circuit 46 responds to the burst of code frequency $f_6$ in the combination of curve A to develop the envelope of oscillations shown in curve F for application to anode 56. Since no burst of code frequency $f_5$ appears in the illustrative example of curve A, no oscillations are, of course, developed in tuned circuit 45.

Since each of the six sections of diode 47 is biased to a threshold level by means of the potential source 67, the various envelopes of oscillations of curves B—F do not have sufficient magnitude by themselves to overcome this bias and cause conduction of the associated diode sections. However, negative polarity timing or line-drive pulses, such as those shown in curve G, are continuously applied to the cathode 48 but they do not have sufficient amplitude to overcome the threshold bias established by source 67. Nevertheless, the conjoint effect of the oscillations developed in tuned circuit 41, as shown in curve B, and the horizontal-drive pulse immediately succeeding the commencement of the signal burst of frequency $f_1$ causes the diode section defined by anode 51 to conduct, resulting in the development of an output pulse across load circuit 61 as shown in curve H. In like fashion, the oscillation envelopes of curve C developed in tuned circuit 42 add to the line-drive pulses occurring in time coincidence therewith to produce the output pulses of curve J across load 62. The oscillations of curve D combine with the line-drive pulse of curve G immediately succeeding the commencement of the burst of code frequency $f_3$ to render the diode section 48—53 conductive and produce the pulse of curve K in load circuit 63. Similarly, the oscillations of curve E and the line-drive pulse immediately succeeding the burst of code frequency $f_4$ conjointly overcome the threshold bias of diode 47 to produce the pulse of curve L in load circuit 64, and the signal of curve F combines with the line-drive pulse immediately succeeding the commencement of the burst of code frequency $f_6$ to gate in that pulse and develop the output signal of curve M across load circuit 66.

The various pulses in curves H—M are supplied over the input circuits of transposition mechanism 68 and through that mechanism to selected ones of the input circuits of the two bi-stable multivibrators included in counting mechanism 26. During the field-trace interval preceding the combination of curve A, the bi-stable multivibrators and the blocking oscillator in unit 26 had been operated in cyclic fashion by the periodically recurring line-drive pulses from sweep system 24 to produce a square wave for application to decoder 16. If switching mechanism 68 is adjusted to the same setting as the corresponding transposition mechanism at the transmitter, the input circuits of the bi-stable multivibrators receive the pulses of curves H—M in synchronism with the application of like pulses to the input circuits of the corresponding multivibrators at the transmitter. The cyclic counting operation of unit 26 is therefore interrupted in the same manner in which it is interrupted at the transmitter to produce a square wave signal for the deflection-control elements of decoder 16 which is identical in wave form and phase with that developed at the transmitter for coding the television signal initially. Decoder 16 consequently operates in synchronism with the coder at the transmitter so that the video signal applied to the input circuit of image reproducer 19 is suitably compensated to effect intelligible image reproduction.

The invention provides, therefore, a novel filter-rectifier-gate circuit for utilizing a plurality of signal bursts of a particular frequency to gate in selected ones of a series of periodically recurring timing pulses.

While a particular embodiment of the invention has been shown and described, modifications may be made, and it is intended in the appended claims to cover all such modifications as may fall within the true spirit and scope of the invention.

I claim:

1. A filter-rectifier-gate circuit comprising: means for developing a series of periodically recurring timing pulses; means for developing a plurality of signal bursts of a particular frequency having a predetermined time relation with respect to said timing pulses but occurring less frequently than said timing pulses and individually having a time duration which is long with respect to the duration of said timing pulses; a non-linear device; biasing means coupled to said device for establishing said device at a predetermined threshold level such that said device conducts only in response to an applied potential exceeding said threshold level; a frequency-selective resonant circuit tuned to said particular frequency; a filter network load circuit for deriving an output signal through said device; means coupling said non-linear device, resonant circuit and load circuit in series such that said resonant circuit is loaded only during conductive intervals of said non-linear device; means coupled to said signal-burst-developing means for supplying each of said signal bursts to said resonant circuit to develop oscillations therein; and means coupled to said timing-pulse-developing means for supplying said timing pulses to said non-linear device with a polarity tending to render said device conductive, the Q of said resonant circuit being high enough that the envelope of oscillations developed therein in response to each signal burst has a magnitude, during the occurrence of the timing pulse immediately succeeding the commencement of each signal burst, which when effectively added to the magnitude of the timing pulse exceeds the threshold level of said device but yet low enough that the envelope has insufficient magnitude to exceed said threshold level during the occurrence of the next-succeeding timing pulse.

2. A filter-rectifier-gate circuit comprising: means for developing a series of periodically recurring timing pulses; means for developing a plurality of signal bursts of a particular frequency having a predetermined time relation with respect to said timing pulses but occurring less frequently than said timing pulses and individually having a time duration which is long with respect to the duration of said timing pulses; a diode having an anode and a cathode; biasing means including a source of negative potential applied to said anode for establishing said diode at a predetermined threshold level such that said diode conducts only in response to an applied potential exceeding said threshold level; a frequency-selective resonant circuit tuned to said particular frequency; a filter network load circuit for deriving an output signal through said diode; means coupling said diode, resonant circuit and load circuit in series such that said resonant circuit is loaded only during conductive intervals of said diode; means coupled to said signal-burst-developing means for supplying each of said signal bursts to said resonant circuit to develop oscillations therein; and means coupled to said timing-pulse-developing means for supplying said timing pulses to said cathode with a negative polarity tending to render said diode conductive, the Q of said resonant circuit being high enough that the envelope of oscillations developed therein in response to each signal burst has a magnitude, during the occurrence of the timing pulse immediately succeeding the commencement of each signal burst, which when effectively added to the magnitude of the timing pulse exceeds the threshold level of said diode but yet low enough that the envelope has insufficient magnitude to exceed said threshold level during the occurrence of the next-succeeding timing pulse.

3. A filter-rectifier-gate circuit comprising: means for developing a series of periodically recurring timing pulses; means for developing a series of signal bursts each of which has a particular one of a series of different identifying frequencies and has a predetermined time relation with respect to said timing pulses; a sectionalized diode having a cathode and a series of anodes each of which is assigned to a different diode section; biasing means including a source of negative potential applied to each of said anodes for establishing each diode section at a predetermined threshold level such that each diode section conducts only in response to an applied potential exceeding said threshold level; a series of frequency-selective resonant circuits each of which is tuned to a particular one of the different frequencies of said signal bursts; a series of filter network load circuits for individually deriving an output signal through an assigned diode section; means coupling each of said resonant circuits in series with an assigned one of said load circuits and an assigned one of said anodes such that each resonant circuit is loaded only during conductive intervals of its assigned diode section; means coupled to said signal-burst-developing means for supplying each of said signal bursts to the resonant circuit tuned to the frequency of the burst to develop oscillations therein; and means coupled to said timing-pulse-developing means for supplying said timing pulses to said cathode with a negative polarity tending to render each of said diode sections conductive, the Q of each of said resonant circuits being high enough that the envelope of oscillations developed therein in response to an applied signal burst has a magnitude, during the occurrence of the timing pulse immediately succeeding the commencement of the burst, which when effectively added to the magnitude of the timing pulse exceeds the threshold level of the diode but yet low enough that the envelope has insufficient magnitude to exceed said threshold level during the occurrence of the next-succeeding timing pulse.

4. A subscription television receiver comprising: means for developing a series of periodically recurring line-drive pulses; means for developing a plurality of code signal bursts of a particular frequency having a predetermined time relation with respect to said line-drive pulses but occurring less frequently than said line-drive pulses and individually having a time duration which is long with respect to the duration of said line-drive pulses; a non-linear device; biasing means coupled to said device for establishing said device at a predetermined threshold level such that said device conducts only in response to an applied potential exceeding said threshold level; a frequency-selective resonant circuit tuned to said particular frequency; a filter network load circuit for deriving an output signal through said device; means coupling said non-linear device, resonant circuit and load circuit in series such that said resonant circuit is loaded only during conductive intervals of said non-linear device; means coupled to said signal-burst-developing means for supplying each of said code signal bursts to said resonant circuit to develop oscillations therein; and means coupled to said line-drive-pulse-developing means for supplying said line-drive pulses to said non-linear device with a polarity tending to render said device conductive, the Q of said resonant circuit being high enough that the envelope of oscillations developed therein in response to each code signal burst has a magnitude, during the occurrence of the line-drive pulses immediately succeeding the commencement of each code signal burst, which when effectively added to the magnitude of the line-drive pulse exceeds the threshold level of said device but yet low enough that the envelope has insufficient magnitude to exceed said threshold level during the occurrence of the next-succeeding line-drive pulse.

5. A subscription television receiver comprising: means for developing a series of periodically recurring line-drive pulses; means for developing a series of code signal bursts each of which has a particular one of a series of different identifying frequencies and has a predetermined time relation with respect to said line-drive pulses; a sectionalized diode having a cathode and a series of anodes each of which is assigned to a different diode section; biasing means including a source of negative potential applied to each of said anodes for establishing each diode section at a predetermined threshold level such that each diode section conducts only in response to an applied potential exceeding said threshold level; a series of frequency-selective resonant circuits each of which is tuned to a particular one of the different frequencies of said code signal bursts; a series of filter network load circuits for individually deriving an output signal through an assigned one of the diode sections; means coupling each of said resonant circuits in series with an assigned one of said load circuits and an assigned one of said anodes such that each resonant circuit is loaded only during conductive intervals of its assigned diode section; means coupled to said signal-burst-developing means for supplying each of said code signal bursts to the resonant circuit tuned to the frequency of the burst to develop oscillations therein; and means coupled to said line-drive-pulse-developing means for supplying said line-drive pulses to said cathode with a negative potential tending to render each of the diode sections conductive, the Q of each of said resonant circuits being high enough that the envelope of oscillations developed therein in response to a code signal burst has a magnitude, during the occurrence of the line-drive pulses immediately succeeding the commencement of each code signal burst, which when effectively added to the magnitude of the line-drive pulse exceeds the threshold level of the diode section but yet low enough that the envelope has insufficient magnitude to exceed said threshold level during the occurrence of the next-succeeding line-drive pulse.

References Cited in the file of this patent

UNITED STATES PATENTS

| | | |
|---|---|---|
| 1,554,189 | Affel | Sept. 22, 1925 |
| 2,553,263 | Loughren | May 15, 1951 |
| 2,662,174 | Rinia | Dec. 8, 1953 |
| 2,744,159 | Wright et al. | May 1, 1956 |
| 2,770,672 | Druz | Nov. 13, 1956 |

FOREIGN PATENTS

| | | |
|---|---|---|
| 986,834 | France | Apr. 4, 1951 |
| 1,099,999 | France | Mar. 30, 1955 |

OTHER REFERENCES

Appendix to the Comments of Zenith Radio Corp., and Teco, Inc., before the F.C.C., in the matter of: Admt. of part 3 of the Commissioner's Rules and Regulations, received by the U.S. Patent Office June 21, 1955 (76 pp.).